: 3,520,864
Patented July 21, 1970

---

3,520,864
CHLORINATED POLYVINYL FLUORIDE
Robert Bacskai, Berkeley, Calif., assignor to Chevron Research Corporation, San Francisco, Calif., a corporation of Delaware
No Drawing. Filed Mar. 27, 1967, Ser. No. 625,981
Int. Cl. C08f 3/22, 27/02
U.S. Cl. 260—92.1
5 Claims

ABSTRACT OF THE DISCLOSURE

Solid chlorinated essentially linear polyvinyl fluoride or solid chlorinated polyvinyl fluoride which is essentially insoluble in solvents below about 100° C. containing about 0.5 to 60 weight percent chlorine. These chlorinated polyvinyl fluorides have lower Vicat softening points than their unchlorinated precursors. They may be used to make molded or extruded objects and surface coatings.

INVENTION BACKGROUND

This invention is directed to solid chlorinated polyvinyl fluorides having lower Vicat softening points than their unchlorinated precursors.

Polyvinyl fluoride which is essentially insoluble in solvents at below about 100° C. and an essentially linear polyvinyl fluoride are available commercially. These polymers and methods for preparing them are described in the Journal of Applied Polymer Science, vol. IV, pp. 55–61 (1960) and British Pat. No. 905,879.

Polyvinyl fluoride which is essentially insoluble in solvents below about 100° C. may, in general, be prepared by polymerizing vinyl fluoride at elevated pressures in an aqueous emulsion containing a water soluble free radical catalyst. This essentially insoluble polymer tends to decompose as it melts (Vicat softening point about 340° F.). This tendency and its insolubility make it difficult to process into molded or extruded objects.

Essentially linear polyvinyl fluoride may be made in a manner similar to that described above but in the presence of a chain transfer agent (telogen). It is believed that the essentially linear polyvinyl fluoride differs from the insoluble variety in structure rather than merely in molecular weight. As expected, the linear variety is soluble in common organic solvents at elevated temperatures. It has a lower softening point and is more easily formed into molded objects than is the insoluble species. However, molded objects made from essentially linear polyvinyl fluoride are brittle and have much lower impact strengths than objects made from the insoluble polymer.

INVENTION DESCRIPTION

It has now been found that the processability of both of the above-described types of polyvinyl fluoride may be enhanced by chlorinating them to a chlorine content of about 0.5 to 60%, preferably 1 to 30%, by weight. The enhancement results from a significant lowering of the Vicat softening point. This effect of chlorination upon polyvinyl fluoride is especially surprising and unexpected since it is known that chlorination increases the softening point of polyvinyl chloride. Additionally, it was found that chlorinated essentially linear polyvinyl fluoride having a chlorine content in the above range has significantly improved ductility and impact strength.

The essentially insoluble and the essentially linear polyvinyl fluoride may be chlorinated by first dispersing them, or by dissolving in the case of the linear material, in a liquid medium which is inert to chlorine and then passing gaseous chlorine through the dispersion or solution. When a dispersion is used, it is preferable to have the polymer in finely divided form, e.g., powdered. The chlorination will normally be carried out at about 1 to 35 atm. and at temperatures in the range of ambient to the boiling point of the inert medium. In most circumstances, temperatures in the range of about 75 and 100° F. will be used. Photochemical, free radical catalysts or other conventional chlorination catalysts may be used in the reaction, if desired. The chlorination time will depend upon the amount of chlorine desired to be incorporated and the reaction conditions. With conventional reaction conditions it will usually be in the range of 5 min. to 12 hrs.

Typical inert media which may be used in this chlorination are perchlorohydrocarbons such as carbon tetrachloride, tetrachloroethylene and perchlorobutadiene, and perfluoro compounds such as perfluorooctane; and mixed halogen compounds, e.g., the freons. Also, water and aqueous hydrogen chloride are satisfactory solvents.

The novel chlorinated polyvinyl fluorides of this invention are colorless solids having number average molecular weights of about 10,000 and above. Their Vicat softening points are significantly lower than those of their unchlorinated precursors. The extent to which their softening points are lowered is proportional to the amounts of chlorine incorporated in them. The chlorination increases the solubility of the polymer in conventional solvents. The reduced specific viscosities (measured in N,N-dimethylacetamide at 0.1 g./100 ml.) of the chlorinated essentially linear polyvinyl fluorides of this invention will usually be about 0.6 to about 1.1 dl./g.

$F^{19}$ nuclear magnetic resonance analysis of a chlorinated, essentially linear polyvinyl fluoride containing 38.9% by weight chlorine showed absorption maxima at 42 and 104 p.p.m. upfield from the standard, trifluoroacetic acid. This analysis indicates the distribution of chlorine atoms with respect to the $\alpha$ and $\beta$ carbon atoms of the vinyl fluoride monomer unit is about random.

EXAMPLES

The following examples illustrate the novel chlorinated polymers of this invention and their enhanced physical properties. These examples are offered to illustrate this invention and are not meant to limit it in any manner.

Example 1

A 10 g. portion of an essentially insoluble polyvinyl fluoride polymer (Du Pont 5097 about 90% insoluble in dimethyl formamide) was dispersed in 150 ml. carbon tetrachloride in a vessel. While illuminating the dispersion from 2 inches with a 275 w. G.E. sun lamp, chlorine gas at 170 ml./min. was bubbled through this dispersion at ambient temperature for 5 minutes. After this time, the reaction product was poured into 500 ml. methanol, and the resulting slurry was filtered. The polymer residue obtained in this way was dried. The polymer was analyzed and found to contain approximately 0.5 weight percent chlorine.

Two grams of this chlorinated polymer with 0.04 g. of a heat stabilizer (Ferro 203) were molded in a 2 inch diameter circular die at 360°–380° F., under 15 tons of pressure for 1 minute. This molded sample was used to determine Vicat melting point. These results are reported in Table I.

In a similar manner other chlorinated polyvinyl fluorides were made using longer chlorination times and the resulting polymers were molded and tested. These results along with the physical data on an unchlorinated polyvinyl fluoride sample are also reported in Table I.

TABLE I

| Example | Clorination time, min. | Percent Cl. | Softening point (Vicat) °F.[1] |
|---|---|---|---|
| 1 | 5 | c.a. 0.5 | 327 |
| 2 | 20 | 10–12 | 290 |
| 3 | 40 | 25–28 | 241 |
| Unchlorinated polyvinyl fluoride | 0 | 0 | 343 |

[1] ASTM D 1525-58T.

Example 4

Ten grams of essentially linear polyvinyl fluoride (Dalvor 720, reduced specific viscosity about 1 dl./g. measured at 0.1 g. polymer/100 ml. dimethyl acetamide at 110° C.) was dispersed in 150 ml. carbon tetrachloride in a vessel. While illuminating the dispersion from 2 inches with a 275 w. G.E. sun lamp, chlorine gas at 170 ml./min. was bubbled through this dispersion at ambient temperature for 10 minutes. After this time, the resulting product was poured into 500 ml. of methanol, and the resulting slurry was filtered off. The polymer residue thereby recovered was dried. This polymer analyzed for 4.06% chlorine and its reduced specific viscosity ($\eta$ sp./c.) in dimethyl acetamide at a concentration of 0.1 g./100 ml. and at 110° C. was 1.01.

Two grams of this chlorinated polymer with 0.04 g. of a heat stabilizer (Ferro 203) were molded in a 2 inch diameter circular mold at 360° F., under 10 tons pressure, for 1 minute. This molded sample was used to determine Rockwell hardness and Vicat softening point. The results are reported in Table II.

Other chlorinated essentially linear polyvinyl fluorides were made as above using longer chlorination times. They and an unchlorinated essentially linear polyvinyl fluoride sample were also molded and tested as described above. The results of these tests are reported in Table II.

TABLE II

| Example | Cl, percent | $\eta_{sp.}/c.$[1] (dl./g.) | Rockwell[2] R | Vicat,[3] °F. | Remarks |
|---|---|---|---|---|---|
| 4 | 4.06 | 1.01 | 56 |  | Not brittle on flexing. |
| 5 | 6.57 | 1.06 | 59 | 292 | Do. |
| 6 | 9.56 | 1.08 | 60 | 270 | Do. |
| 7 | 11.65 | 0.73 | 64 | 252 | Do. |
| Unchlorinated | 0 | 0.97 | ([4]) | 320 | Brittle on flexing. |

[1] In N,N-dimethylacetamide at 0.1 g./100 ml., 110° C.
[2] ASTM D-785-62.
[3] ASTM D-1525-58T.
[4] Too brittle.

Other chlorinated, essentially linear polyvinyl fluorides were prepared as described in Example 4. These materials analyzed for 34.99, 38.93 and 53.6 weight percent chlorine, respectively. Their reduced specific viscosities were 0.61, 0.63 and 0.60 dl./g., respectively.

Example 8

A chlorinated essentially linear polyvinyl fluoride having a reduced specific viscosity of 1.07 dl./g. and 6.61 weight percent chlorine was made by the method described in Example 4. Twenty-five grams of this polymer blended with 0.4 g. of a heat stabilizer (Ferro 203) were molded in a 1/8 x 2 x 4.55 inch die at 360° F. under 5 tons pressure for 1 minute. This molded sample and a similar sample of unchlorinated essentially linear polyvinyl fluoride (reduced specific viscosity 0.97 dl./g.) were tested for impact strength by ASTM D-256-56. The impact strength of the chlorinated material was 155.5 ft.-lbs./in.$^2$; whereas that of the unchlorinated material was 55.7 ft.-lbs./in.$^2$.

The chlorinated polyvinyl fluorides are useful in making molded and extruded objects such as films, fibers, sheets, foils, tubes and rods and surface coatings for fabrics, leather and the like. In such use it is anticipated that they may be blended with other polymers, heat stabilizers, oxidation stabilizers, pigments, dyes, dye acceptors, fillers, plasticizers and the like.

As will be evident to those skilled in the art, various modifications on this invention can be made or followed, in the light of the foregoing disclosure and discussion, without departing from the spirit or scope of the disclosure or from the scope of the following claims.

I claim:

1. Solid chlorinated polyvinyl fluoride having about 0.5 to 60% chlorine by weight prepared by the process which comprises chlorinating polyvinyl fluoride dispersed in perchlorohydrocarbon.

2. The chlorinated polyvinyl fluoride of claim 1 wherein the percent chlorine by weight is about 1 to 30 and the perchlorohydrocarbon is carbon tetrachloride.

3. The chlorinated polyvinyl fluoride of claim 1 wherein said chlorinated polyvinyl fluoride is essentially insoluble in dimethyl formamide at below about 100° F. and has a Vicat softening point below about 340° F.

4. The chlorinated polyvinyl fluoride of claim 1 wherein said chlorinated polyvinyl fluoride is essentially linear and has a Vicat softening point below about 320° F.

5. The chlorinated polyvinyl fluoride of claim 1 wherein said chlorinated polyvinyl fluoride has an average number molecular weight of more than about 10,000.

References Cited

UNITED STATES PATENTS

| 2,777,835 | 1/1957 | Calfee | 260—92.1 |
| 3,102,087 | 8/1963 | Jobard | 260—92.1 |

JOSEPH L. SCHOFER, Primary Examiner

J. A. DONAHUE, Jr., Assistant Examiner